United States Patent
Fukui et al.

[11] Patent Number: 5,982,912
[45] Date of Patent: Nov. 9, 1999

[54] PERSON IDENTIFICATION APPARATUS AND METHOD USING CONCENTRIC TEMPLATES AND FEATURE POINT CANDIDATES

[75] Inventors: Kazuhiro Fukui; Osamu Yamaguchi, both of Osaka-fu, Japan

[73] Assignee: Kabushiki Kaisha Toshiba, Kawasaki, Japan

[21] Appl. No.: 08/815,135

[22] Filed: Mar. 12, 1997

[30] Foreign Application Priority Data

Mar. 18, 1996 [JP] Japan .................................. 8-061463

[51] Int. Cl.⁶ ........................................ G06K 9/00
[52] U.S. Cl. .......................................... 382/118; 382/115
[58] Field of Search ........................ 434/155; 902/3–6, 902/25–29; 340/541, 825.3; 364/413.13; 382/100, 110, 115, 116, 118, 168, 170–175, 190, 192, 194.5, 197, 199, 204, 205, 206, 203, 209, 215, 212, 213, 216, 218, 221, 217, 220, 224, 225, 241–243, 261, 264, 271, 272, 278, 282–284, 117

[56] References Cited

U.S. PATENT DOCUMENTS

| | | | |
|---|---|---|---|
| 4,975,969 | 12/1990 | Tal | 382/2 |
| 5,719,951 | 2/1998 | Shackleton et al. | 382/118 |
| 5,835,616 | 11/1998 | Lobo et al. | 382/118 |

OTHER PUBLICATIONS

A. Pentland et al; "View–Based and Modular Eigenspaces for Face Recognition", IEEE Computer Vision and Pattern Recognition, pp. 84–91, (1994).

P. Hallinan; "Recognizing Human Eyes", SPIE vol. 1570 Geometric Methods Vision, pp. 214–226, (1991).

*Primary Examiner*—Amelia Au
*Assistant Examiner*—F. E. Cooperrider
*Attorney, Agent, or Firm*—Finnegan, Henderson, Farabow, Garrett & Dunner, L.L.P.

[57] ABSTRACT

In a person identification apparatus, a normalized face image is used to identify a person. When the face image of the person is input, a face area extraction section extracts the face area from the face image. A feature point extraction section extracts a plurality of candidates of feature points from the face area using a separation filter. A feature point set selection section selects sets of the candidates from the plurality of candidates of feature points according to face structure information. A feature point decision section extracts neighboring patterns of each candidate from the face area for the set of candidates, calculates a similarity value between the neighboring patterns of each candidate and the template pattern, and selects a subset of the candidates having the highest similarity values. A normalization section generates a normalized face image of the face area according to the selected subset of the candidates. A recognition section compares the normalized face image with the registered image to identify the person.

11 Claims, 5 Drawing Sheets

PERSON IDENTIFICATION APPARATUS AND METHOD USING CONCENTRIC TEMPLATES AND FEATURE POINT CANDIDATES

BACKGROUND OF THE INVENTION

1. Field of the Invention

The present invention relates to a person identification apparatus and method. More specifically, the invention relates to an apparatus and method for extracting feature points from a face image to identify a person.

2. Description of the Related Art

Systems for automatically identifying people have many uses, including enhancing security. Basic processing of a personal identification system of the prior art is as follows.
1. Extraction of the face area from a face image of a person
2. Extraction of feature points such as eyes, nose, or mouth from the face area and
3. Discrimination processing Discrimination processing falls into one of two categories. In the first method, a feature vector is generated according to the position, shape, and size of a feature point and a similarity value between the feature vector and a plurality of previously registered dictionary vectors. The plurality of dictionary vectors correspond to the object persons to be confirmed. Accordingly, the person who corresponds to the face image is identified as the object person having the highest similarity value.

In the second method, the position and size of the feature points in the face image are normalized by two-dimensional affine conversion. This normalized image is compared with a dictionary normalized image which corresponds to the object person. Like the first method, the person who corresponds to the face image is identified as the object person having the highest similarity value.

In the two above-mentioned methods, the similarity value is calculated as a statistical distance such as a relative value between images or the Euclidean distance in characteristic space. In discriminative processing, various kinds of pattern recognition theories are used for character identification. In this case, a critical factor for achieving quality discrimination is the ability to extract the feature points. In the first method, the effect of extracting the feature points is large because the position, shape and size of each feature point is used as an element of the feature vector. In the second method, the effect of extracting the feature points is also large because the quality of discrimination depends on minuteness of the normalized image, and the dictionary image in the case of calculating the similarity value.

A conventional method for extracting the feature points is based on edge information in the image. By using an edge operator, the edge in the face area is extracted and eyes, nose, and mouth are detected according to an edge model. Because the shape of the face image is three-dimensionally transformed, it is difficult to detect a clear edge from the face image. Therefore, this method is only applied in cases where lighting conditions are good.

Using a template to extract feature points is another method used. In this method, the feature points are extracted by using a template (e.g., a dictionary pattern) to match a previously registered eye, nose, or mouth. Only patterns of areas such as the eyes, nose, or mouth are used for matching. Therefore, it is difficult to discriminate one area from another similar area. To process many different positions and sizes of the eyes, nose, or mouth, numerous templates and data associated with each are needed to provide an adequate sample for comparison with features of the face under analysis. Therefore, when using this method the number of calculations required greatly increases as the scope of the search area for recognizable faces increases.

A problem with this second method of extracting feature points concerns proper extraction of the feature points using the location information taken from the face area. For example, a method to extract a feature point by connecting each feature point using a virtual spring assumes that the eyes, nose, and mouth are located on the face in a normal distribution. However, in this method, it is difficult to distinguish partial errors because the connected shape of the virtual spring may represent an entire facial feature. Mistaking the edge of an eyebrow for a black eye is an example of a partial error.

In yet another method, feature points are correctly extracted by minimizing the value of an evaluation function. A problem associated with this method, is setting the weight of the evaluation function. This method requires repeated calculations for processing the minimization.

SUMMARY OF THE INVENTION

It is an object of the present invention to provide a person identification apparatus and method to extract feature points from a face image and correctly match the extracted feature points with the person from whom they were extracted.

Consistent with the present invention, there is provided a person identification apparatus, comprising: an image input device for inputting the image of a person to be confirmed; a face area extraction device for extracting a face area from the image of the person; a feature point extraction device for extracting a plurality of candidate feature points from the face area using a separation filter; a feature point set selection device for selecting sets of the candidates of feature points from the plurality of candidates of feature points according to face structure information; a feature point decision device for extracting the neighbor pattern of each candidate used to calculate the similarity values between the neighbor patterns of each candidate and the template pattern previously registered, and for selecting one set of candidates whose sum of similarity values is the highest among all of the candidates; a normalization device for generating a normalized face image of the face area according to one set of the candidates; and a recognition device for comparing the normalized face image with the registered image to identify the person.

Also consistent with the present invention, there is provided a method for identifying a person using a face image, comprising the steps of: inputting the face image of the person to be confirmed; extracting a face area from the face image of the person; extracting a plurality of candidate feature points from the face area using a separation filter; selecting sets of candidate feature points from the plurality of candidates of feature points according to face structure information; extracting neighboring patterns of each candidate from the face area; calculating similarity of value between the neighbor pattern of each candidate and the template pattern; selecting the candidates with the highest sum of similarity values among all sets of the candidates; generating a normalized face image according to the set of candidates; and comparing the normalized face image with a registered image to identify the person.

Further consistent with the present invention, there is provided a computer readable memory containing computer-readable instructions to identify a person, comprising: an instruction section for causing a computer to input a face image of the person to be confirmed; an instruction section for causing a computer to extract a face area from the face image of the person; an instruction section for causing a computer to extract a plurality of candidate feature points from the face area using a separation filter; an instruction section for causing a computer to select sets of candidate feature points from the plurality of candidate feature points according to face structure information; an instruction section for causing a computer to extract the neighboring pattern of each candidate; an instruction section for causing a computer to calculate the similarity between the neighboring pattern of each candidate and the template pattern; an instruction section for causing a computer to select one set of the candidates whose sum of similarity values is highest among all of the candidates; an instruction section for causing a computer to generate a normalized face image according to that set of candidates; and an instruction section for causing a computer to compare the normalized face image with the registered image to identify the person.

DETAILED DESCRIPTION OF THE PREFERRED EMBODIMENTS

Figure 1:
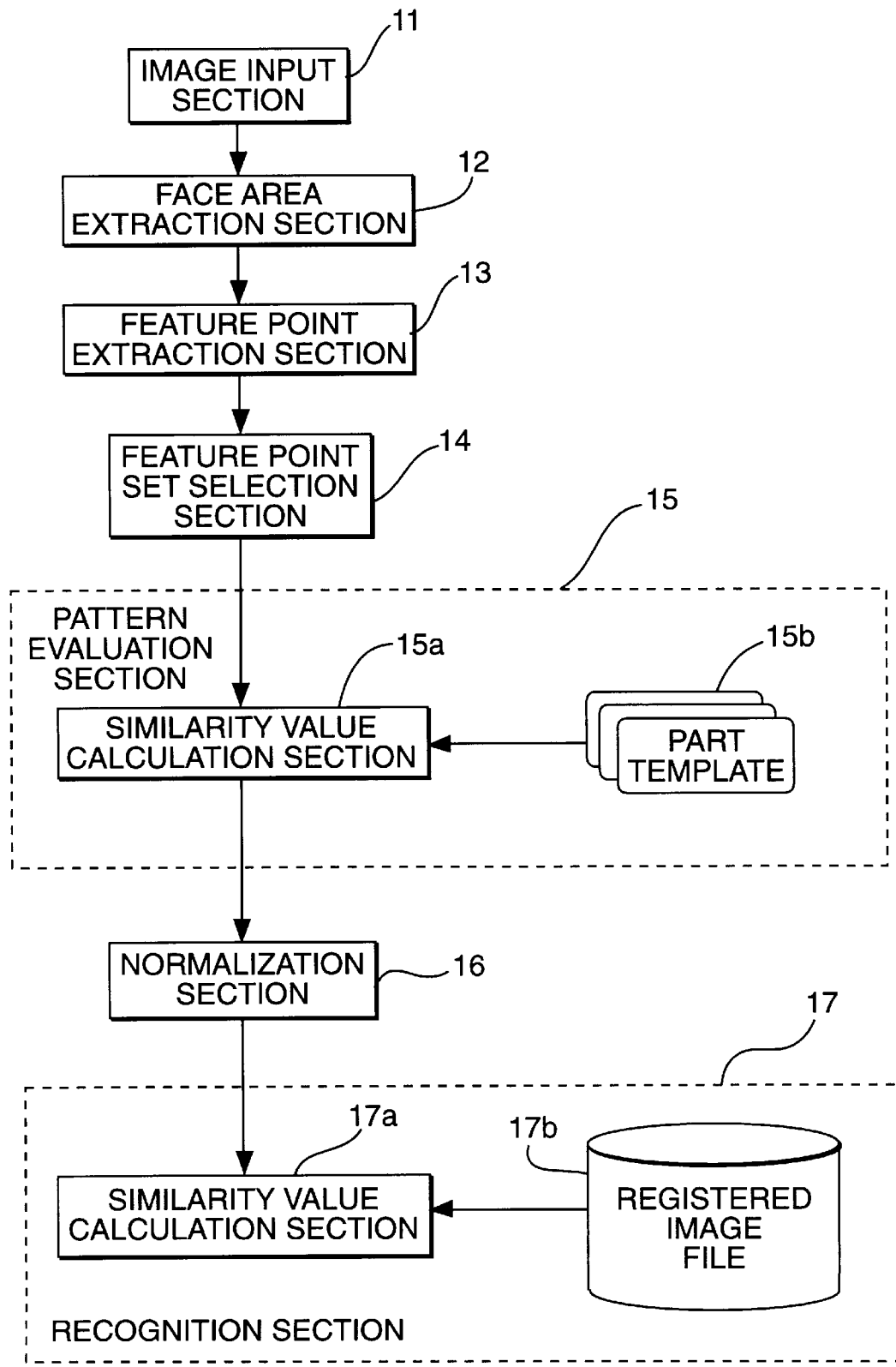
FIG. 1 is a block diagram of the person identification apparatus according to the present invention.

One embodiment of the present invention is described below with reference to the drawings. FIG. 1 is a block diagram of the person identification apparatus according to the invention. The person identification apparatus of the embodiment comprises an image input section 11, a face area extraction section 12, a feature point extraction section 13, a feature point set selection section 14, a pattern evaluation section 15, a normalization section 16 and a recognition section 17. The image input section 11 comprises, for example, a TV camera to input a face image of the person to be identified. The face image is digitized by an A/D converter (not shown) and sent to the face area extraction section 12.

The face area extraction section 12 continuously extracts data relating to the face area of the person from the face image. In this case, section 12 moves a previously-registered standard face image (template) on the face image and calculates a relative value between the template and the face image. The area whose relative value is highest among all relative values is defined as the face area. When the relative value is lower than a threshold value, the face area is not included in the image. For example, where the maximum relative value is 100, the threshold may be set at 30.

The feature point extraction section 13 extracts candidates of the feature points, as discussed below, including an eye or nose hole, from the face area using a separation filter. Because this processing may require a great deal of time, section 13 processes pixels whose intensity value is lower than the threshold. The threshold is calculated by an intensity distribution of the entire face area using a process referred to as the MODE method. In order to handle various size feature points, several separation filters having different sizes are applied simultaneously. The size of the filter whose output is a maximum is defined as a size of the feature point and the filter output is defined as an output value. After the entire face area is processed, section 13 smooths the filter output by a Gaussian filter and extracts a local maximum point as the candidate feature point.

The feature point set selection, section 14, detects structure parameters from each set of candidates of feature points and uses an evaluation function to calculate the value of the structure parameters by unit. Then, section 14 selects n-sets of candidate feature points with evaluation values having a high rank, as the candidates to send to the pattern evaluation section 15. For example, the set of feature points may comprise four features (e.g., both eyes, and both nostrils).

The pattern evaluation section 15 includes a similarity value calculation section 15a and a plurality of parts template 15b. The template 15b comprises a standard pattern area of eyes, nose, or mouth. The similarity value calculation section 15a extracts neighboring patterns for feature points by unit of the set of candidates, and calculates a similarity value between each neighboring pattern of n-set of feature points and each part of the template. Section 15a selects one set of feature points, whose sum of similarity values is highest among all sets of feature points, as the correct set of the feature points. The normalization section 16 generates a normalized face image according to one set of feature points selected by the pattern evaluation section 15, Section 16 then transmits the normalized face image to the recognition section 17.

The recognition section 17 includes a similarity value calculation section 17a and a registered image file 17b. The registered image file 17b previously stores registered face images of a plurality of registered people. The similarity value calculation section 17a calculates similarity values between the normalized face image and each registered face image. Section 17a determines the person corresponding to the registered face image with the highest similarity value to be the person in the input face image.

Figure 2:
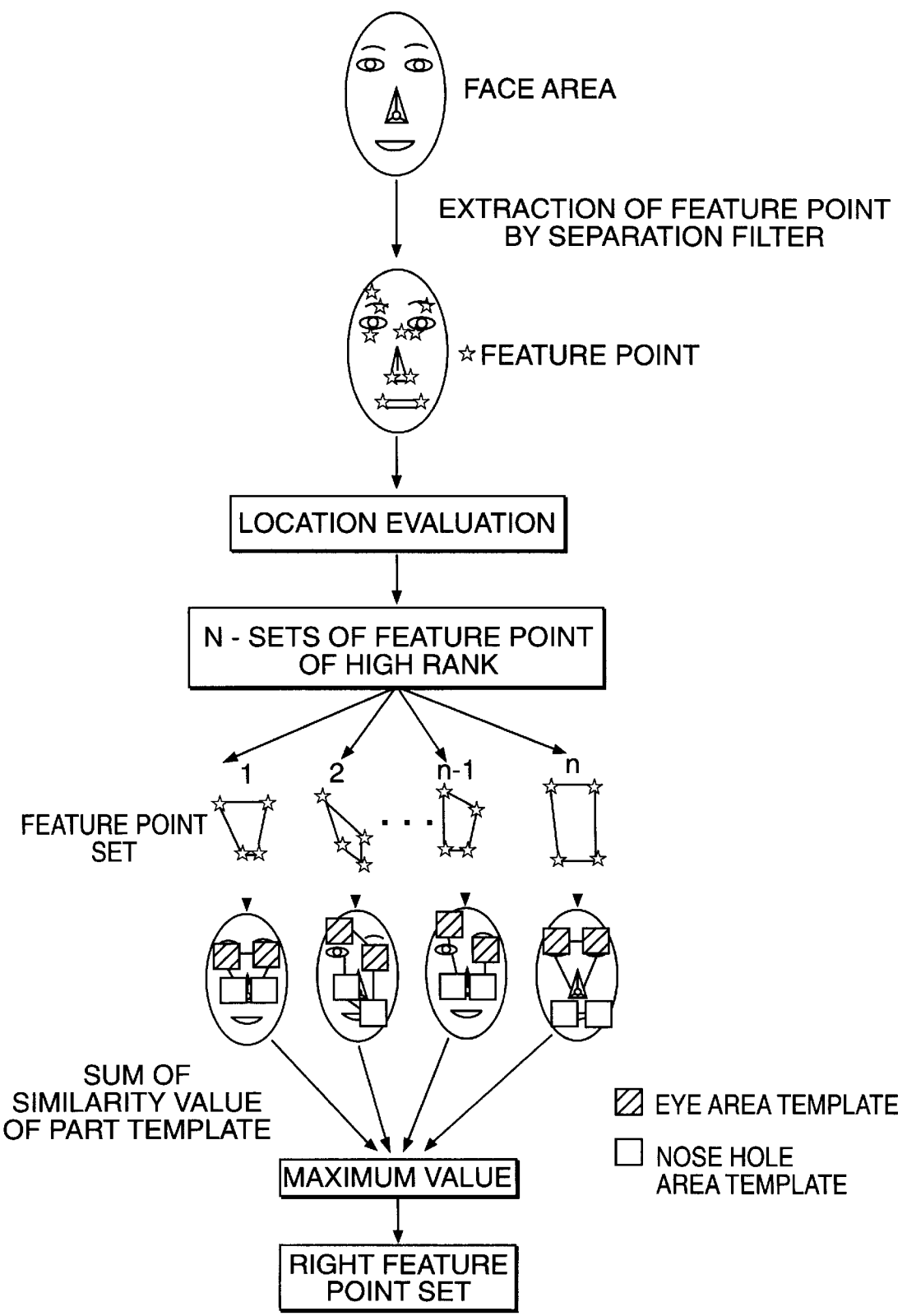
FIG. 2 is a schematic diagram of the processing of person confirmation according to the present invention.

FIG. 2 is a schematic diagram of how to process the person confirmation apparatus according to an embodiment of the present invention. The face image is input by a TV camera set in the lower part of a display. The discussion assumes that the face image, including the nose hole of the person, is input and four feature points are extracted from the face area, though this may vary based upon the design considered. First, the face area is extracted from the face image. The feature point extraction section 13 extracts the feature points such as an eye, nostril, or mouth edge, using the separation filter.

Figure 3A:
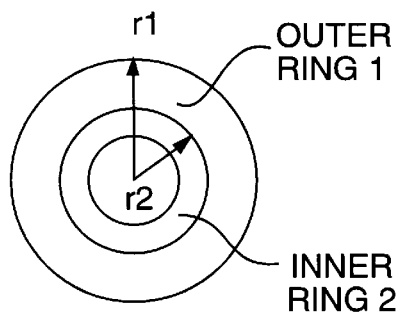
FIGS. 3A, 3B, and 3C are schematic diagrams of the separation filter and filter output corresponding to each position between an object area and the separation filter.
Figure 3B:
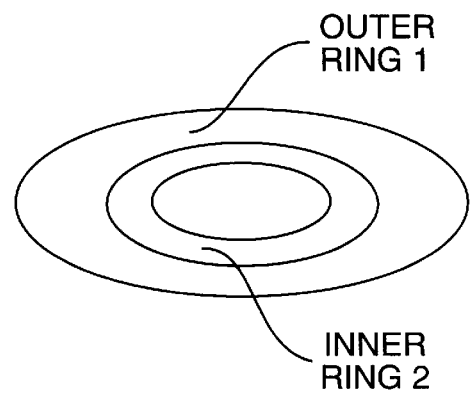
Figure 3C:
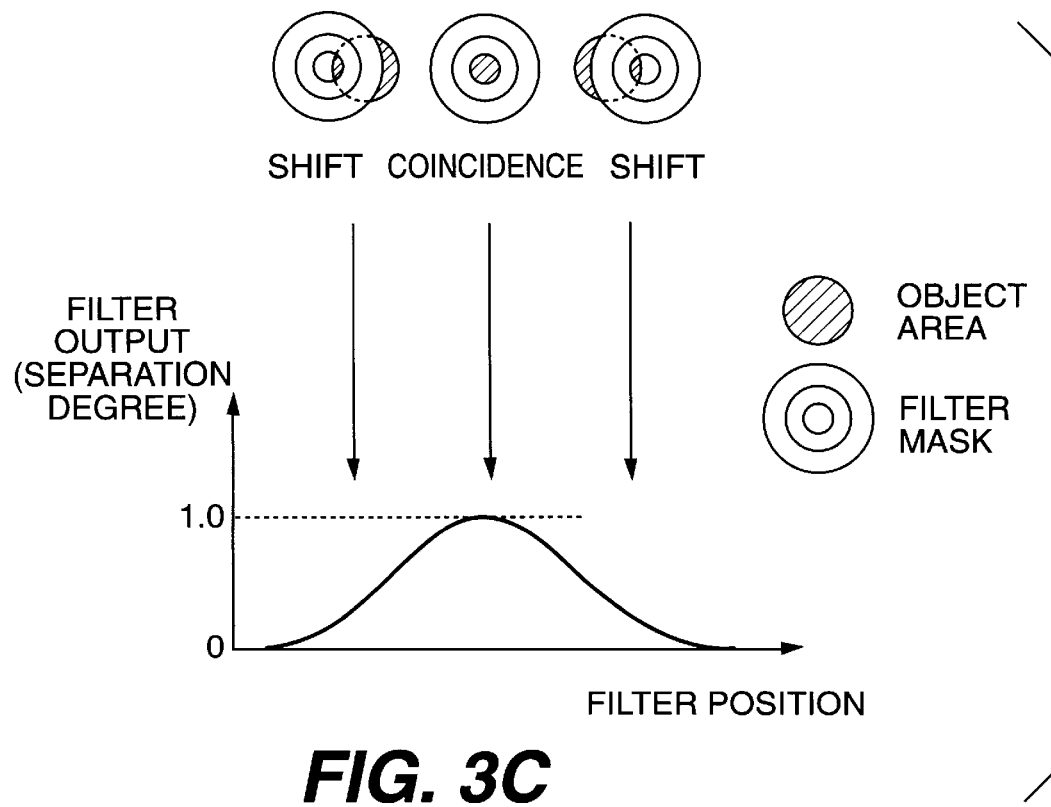

FIGS. 3A and 3B show the structure of the separation filter. The separation filter is a mask of concentric shapes comprising outer mask 1 and inner mask 2. While the mask is continuously moved on the face area, a characteristic quantity of pixels in the outer mask and a characteristic quantity of pixels in the inner mask are calculated respectively. The separability between the two characteristic quantities is calculated as the filter output. When the circular mask shown in FIG. 3A fits on a circular feature point (e.g., pupil or nostril), filter output is "1.0" as shown in FIG. 3C. When the circular mask is removed from the circular feature point, the filter output is gradually reduced. When the circular mask is shifted and provided on an area without the circular region of the face area, the filter output is almost "0" as shown in FIG. 3C. In case an ellipse mask, shown in FIG. 3B, fits the ellipse feature point (e.g., lip, eye-black area and white area), the filter output is "1.0" in the same way. That is, the separability is represented as follows.

$$\eta = \frac{\sigma^{b^2}}{\sigma^{T^2}}$$

$$\sigma^{b^2} = n_1(\overline{P}_1 - \overline{P}_m)^2 + n_2(\overline{P}_1 - \overline{P}_m)^2$$

$$\sigma^{T^2} = \sum_{i=0}^{N-1}(P_i - \overline{P}_m)^2$$

N: number of all pixels in the outer ring 1 and the inner ring 2
$n_1$: number of pixels in the outer ring 1
$n_2$: number of pixels in the inner ring 2
$P_i$: density value of pixel i
$\overline{P}_1$: average of density value in the outer ring 1
$\overline{P}_2$: average of density value in the inner ring 2
$\overline{P}_m$: average of density value in the outer ring 1 and the inner ring 2
$0 < \eta_i \leq 1.0$ The separability for a completely flat area (i.e., all white pixels or all black pixels) is not defined because the distribution of the denominator of the above equation is "0". If $\sigma^T$ is smaller than the threshold value, $\eta$ is set to 0.

The density value, a measure of the intensity of each pixel in an image, represents the density of pixels per unit area. If a restriction that the density values of the pupil and the nostril are smaller than other parts is applied, the processing time may be reduced. In this case, the shape of σ mask formed as a circle, an ellipse, a rectangle, a triangle, or other various shapes of the feature points is extracted. As mentioned above, the circular mask is used to extract the eye black, the nose hole and the edge of the mouth. The ellipse mask is used to extract the entire area of the eye, eye brow, or lip. If various shapes of the mask are simultaneously used to examine the distribution of the filter output, the feature point is correctly extracted. For example, filter output of the eye is a high value by both the circular mask and the ellipse mask.

Therefore, the area whose filter output for both the circular mask and the ellipse mask is high is extracted as eye area.

Figure 4:
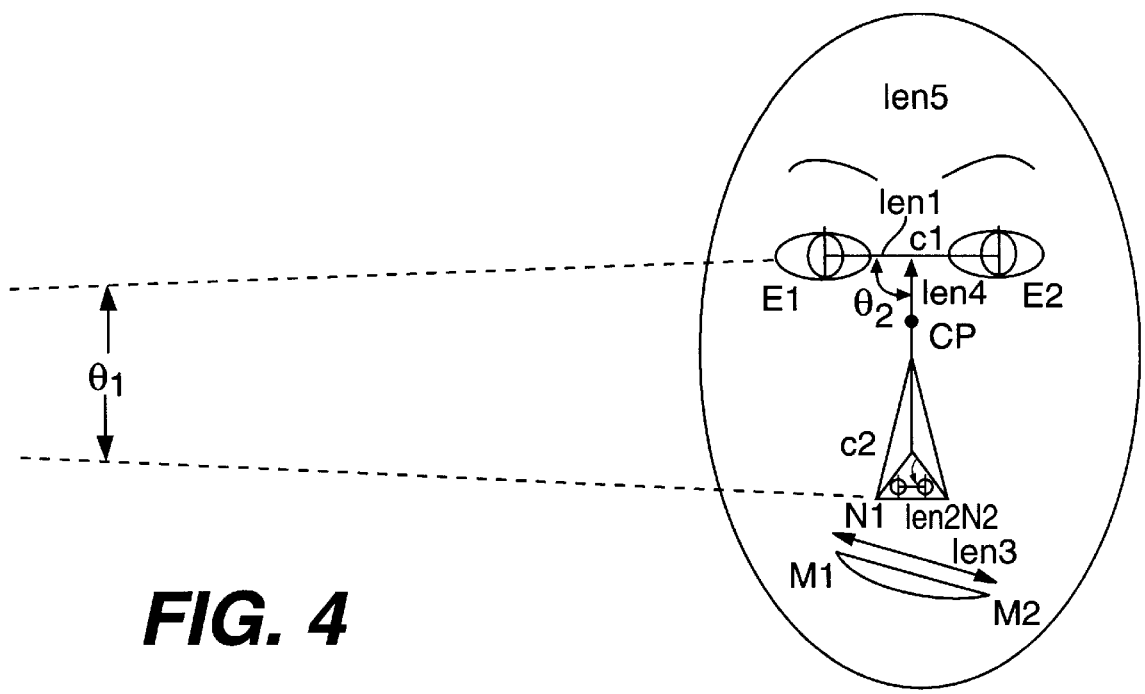
FIG. 4 is a schematic diagram of face structure information for the feature points on the face area.

In some cases, candidates of feature points may include incorrect feature points. The feature point set selection section 14 selects a correct set of feature points according to the face structure information. FIG. 4 shows the face structure parameters of feature points in the face area. In FIG. 4, $E_1$ and $E_2$ are both center points of eye blacks, $N_1$ and $N_2$ are center points of nose holes, $M_1$ and $M_2$ are edge points of the mouth, len 1 is a distance between $E_1$ and $E_2$, len 2 is a distance between $N_1$ and $N_2$, $C_1$ is a midpoint between $E_1$ and $E_2$, C2 is a midpoint between $N_1$ and $N_2$, len 4 is a distance between $C_1$ and $C_2$, $\theta_1$ is an angle between vector $E_1 E_2$ and a vector $N_1 N_2$, $\theta_2$ is an angle between the vector $E_1 E_2$ and a vector $C_1 C2$. The following evaluation function is defined according to the face structure parameter.

$$Val = \sum_{i=1}^{3} w_i * sc_i$$

$W_i$: weight $$SC_1 = \sum_{i=1}^{4} \eta_i^2$$

$SC_2 : 90 - |\theta_1|$ $SC_3 : 90 - |\theta_2 - 90|$

In application, to avoid an increase of processing time, a threshold for (len 1/len 2) or (len 1/len 5) may be predetermined experimentally. In this way, the feature point set selection section 14 selects n-sets of the feature points whose evaluation values (Val) rank high (from 1st to n-th) as set candidates of the feature points. (Each set comprises four feature point) In this case, if "n" is set as a large value, a probability that the correct set is included in the set of candidates becomes high. However, the processing time increases. Therefore, "n" is set as "10".

Figure 5:
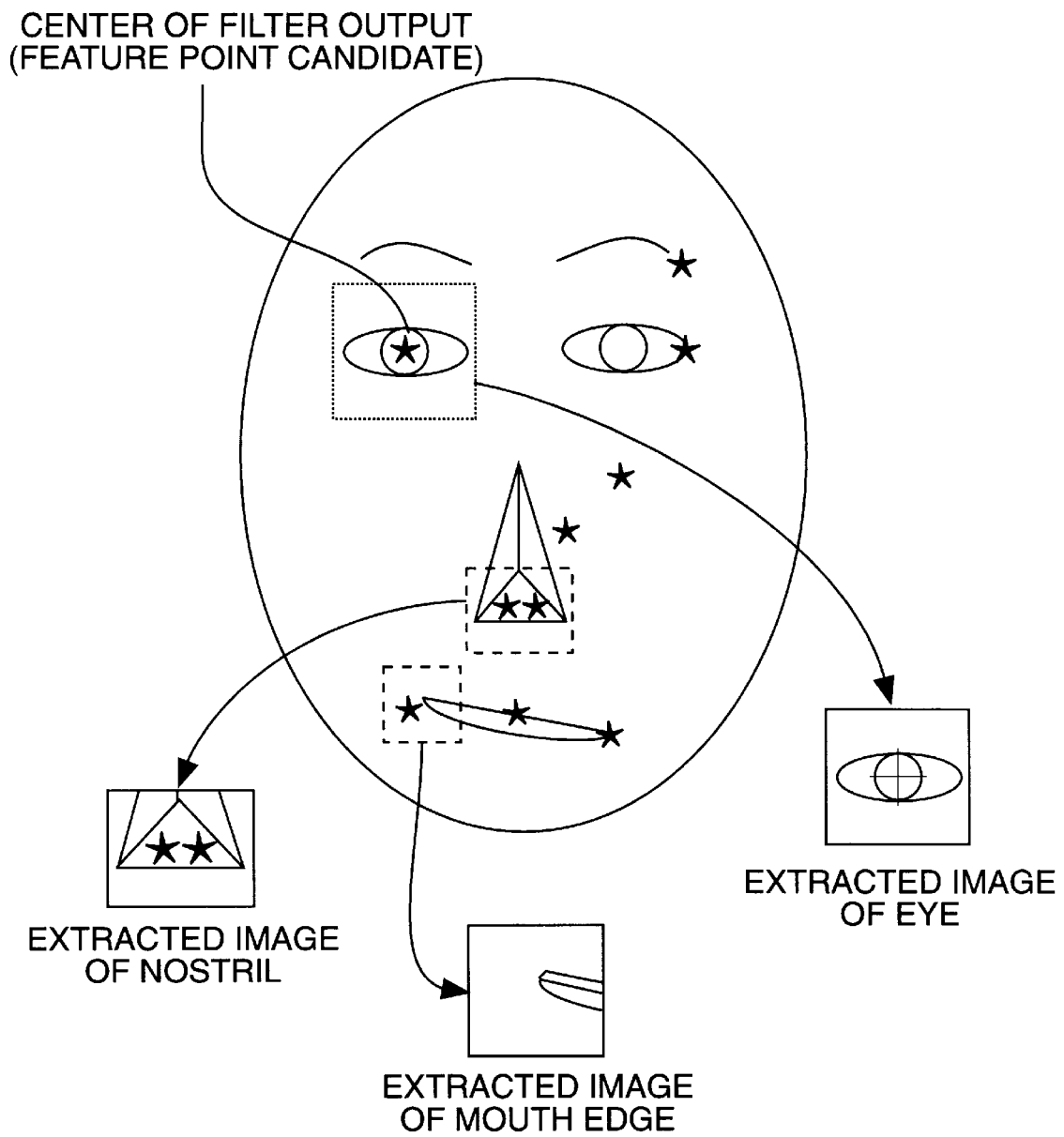
FIG. 5 is a schematic diagram of an extracted image as a neighboring pattern which corresponds to feature points on the face area.

Next, the pattern evaluation section 15 extracts a rectangular area of the neighboring pattern, including the position of each feature point, from the face area. The size of the rectangular area may be based on the size of the filter. FIG. 5 is a schematic diagram of extraction of the rectangular area. The rectangular area is matched with the corresponding part of the template previously registered (eye, nose, or mouth) and a similarity value between the rectangular area and each template is calculated. The template is used as an average image of eye, nose, or mouth of a plurality of persons. Multiple templates are used when a space method is used. The pattern evaluation section 15 calculates a sum of the similarity of each of the four rectangular areas, by unit, and selects the set of candidates with the largest sum as the correct set.

Figure 6:
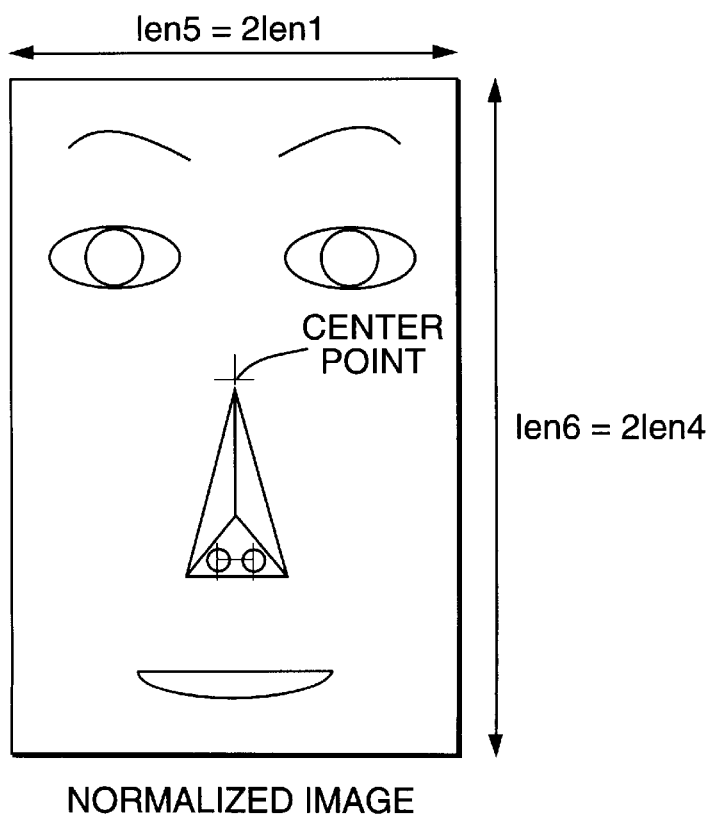
FIG. 6 is a schematic diagram of a normalized face image generated by a selected set of feature points.

Next, the normalization section 16 generates the normalized face image whose position and size are normalized by one set of candidates. FIG. 6 shows the content of the normalized face image. As shown in FIG. 6, when the position of the eye and the nostril is at issue, the direction of len 1 may be changed to be parallel to the direction of len 3. Point "CP" of the original face image is located at ⅓ of the distance between len 4 and point $C_1$ in FIG. 4. "CP" is located at the center point of the normalized face image in FIG. 6. A width, len 5 of the normalized face image is twice the value of len 1 and a height, len 6, of the normalized face image is two times that of len 4 as shown in FIG. 6. In short, the front natural face image of a person is artificially generated even if the facial action of the original face image is unnatural.

The recognition section 17 calculates a similarity value between the normalized face image and each registered image stored in the registered image file 17b. The registered image having the largest similarity value is selected and the registered person corresponding to the original face image is confirmed as the registered image.

Thus, in a system consistent with the present invention, the candidate feature points are extracted by the separation filter to extract the predetermined shape area. Then, the sets of the candidates of the feature points are limited according to the face structure information. Therefore, without influence from or change of the density value, the feature points (eye, nose hole, mouth) are correctly extracted to confirm the person of the original face image.

A memory device, including a CD-ROM, floppy disk, hard disk, magnetic tape, or semiconductor memory can be used to store instructions for causing a processor or computer to perform the process described above.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A person identification apparatus, comprising:
   image input means for inputting an image of a person to be identified;
   face area extraction means for extracting a face area from the inputted image of the person;
   feature point extraction means for extracting a plurality of candidate of feature points from the extracted face area by superimposing a separation filter on the face area, the separation filter being a mask of concentric shapes including an outer ring and an inner ring to calculate a separability of feature value between the outer ring and the inner ring;
   feature point set selection means for selecting n-sets of candidate feature points from all sets of candidate feature points according to face structure information;
   feature point decision means for extracting a neighbor pattern including a position of each candidate feature point from the face area, a size of the neighbor pattern being based on a size of the separation filter, for calculating a similarity value between the neighbor pattern for each candidate feature point and a previously-registered template pattern, the template pattern being a standard image of the feature point, and for selecting one set of candidate feature points whose sum of the similarity values is highest among n-sets of the candidate feature points;
   normalization means for generating a normalized face image of the face area according to the one set of candidate feature points; and
   recognition means for comparing the normalized face image with previously-registered image to identify the person.

2. The person identification apparatus according to claim 1, wherein said image input means inputs an image including a nostril of the face of the person.

3. The person identification apparatus according to claim 1, wherein
   a plurality of the separation filters having different sizes are superimposed on the face area to handle various sizes of the feature points.

4. The person identification apparatus according to claim 3, wherein said feature point extraction means includes means for respectively calculating the separability of a feature value between pixels included in the outer ring and pixels included in the inner ring according to a decision equation while the mask is superimposed on the face area.

5. The person identification apparatus according to claim 4, wherein said feature point extraction means includes means for extracting pixels area corresponding to a position of the mask from the face area as the candidate feature point when the separability corresponding to the position of the mask exceeds a threshold.

6. The person identification apparatus according to claim 1, wherein said face structure information includes a first distance between a pair of eyes, a second distance between a pair of nostrils, a third distance between a pair of edges of a mouth, a fourth distance between a center point of the first distance and a center point of the second distance, a first angle between a vector of the first distance and a vector of the second distance, and a second angle between a vector of the first distance and a vector of the fourth distance.

7. The person identification apparatus according to claim 6, wherein said feature point set selection means includes means for calculating an evaluation value for all sets of candidate feature points according to the face structure information, and means for selecting n-sets of the candidate feature points whose evaluation values have a high rank among all sets of candidate feature points.

8. The person identification apparatus according to claim 1, wherein said feature point decision means includes means for extracting a rectangular area corresponding to the position of the candidate feature point from the face area as the neighbor pattern.

9. The person identification apparatus according to claim 1, wherein said normalization means includes means for normalizing position and size of the one set of candidate feature points to generate the normalized face image.

10. A method for identifying a person corresponding to a face image, comprising the steps of:
    inputting the face image of the person to be identified;
    extracting a face area from the face image of the person;
    extracting a plurality of candidate feature points from the face area by superimposing a separation filter on the face area, the separation filter being a mask of concentric circles including an outer ring and an inner ring to calculate a separability of feature value between the outer ring and the inner ring;
    selecting n-sets of candidate feature points from all sets of candidate feature points according to face structure information;
    extracting a neighbor pattern including a position of each candidate feature point from the face area, a size of the neighbor pattern being based on a size of the separation filter;
    calculating a similarity value between the neighbor pattern of each candidate feature point and a previously-registered template pattern, the template pattern being a standard image of the feature point;
    selecting one set of the candidate feature points whose sum of the similarity values is highest among n-sets of the candidate feature points;
    generating a normalized face image of the face area according to the one set of candidate feature points; and
    comparing the normalized face image with a previously registered image to identify the person.

11. A computer readable memory containing computer-readable instructions to identify a person, comprising:
    instruction means for causing a computer to input a face image of the person to be identified;
    instruction means for causing a computer to extract a face area from the face image of the person
    instruction means for causing a computer to extract a plurality of candidate feature points from the face area by superimposing a separation filter on the face area, the separation filter being a mask of concentric shapes including an outer ring and an inner ring to calculate a separability of feature value between the outer ring and the inner ring;
    instruction means for causing a computer to select n-sets of candidate feature points from all sets of candidate feature points according to face structure information;
    instruction means for causing a computer to extract a neighbor pattern including a position of each candidate feature point from the face area, a size of the neighbor pattern being based on a size of the separation filter;

instruction means for causing a computer to calculate a similarity value between the neighbor pattern of each candidate feature point and a previously-registered template pattern, the template pattern being a standard image of the feature point;

instruction means for causing a computer to select one set of the candidate feature points whose sum of the similarity values is highest among n-sets of the candidate feature points;

instruction means for causing a computer to generate a normalized face image of the face area according to the one set of candidate feature points; and instruction means for causing a computer to compare the normalized face image with a previously-registered image to identify the person.

* * * * *

UNITED STATES PATENT AND TRADEMARK OFFICE
CERTIFICATE OF CORRECTION

PATENT NO. : 5,982,912
DATED : November 9, 1999
INVENTOR(S) : Kazuhiro FUKUI et al.

It is certified that error appears in the above-identified patent and that said Letters Patent is hereby corrected as shown below:

Claim 1, col. 7, line 12, after "candidate", delete "of".

Claim 11, col. 8, line 47, "computer readable" should read --computer-readable--.

Claim 11, col. 8, line 52, after "person", insert --;--.

Signed and Sealed this

Eighth Day of August, 2000

Attest:

Q. TODD DICKINSON

*Attesting Officer*     *Director of Patents and Trademarks*